3,355,485
PREPARATION OF SODIUM CYCLOHEXYL
SULFAMATE FREE OF SULFATE IONS
Vipin D. Shah, Waukegan, Ill., assignor to Abbott
Laboratories, Chicago, Ill., a corporation of Illinois
No Drawing. Filed Sept. 20, 1963, Ser. No. 310,440
2 Claims. (Cl. 260—513.6)

This invention relates to the manufacture of sodium cyclohexylsulfamate. More particularly, it is concerned with the manufacture of pure sodium cyclohexylsulfamate from cyclohexylammonium-N-cyclohexylsulfamate by way of calcium cyclohexylsulfamate.

Calcium cyclohexylsulfamate and sodium cyclohexylsulfamate have recently reached a very sizable market as artificial sweeteners and the demand for these two salts is steadily increasing. However, manufacturers of sodium cyclohexylsulfamates have had various problems in the preparation of the pure compound because, during its preparation, various by-products are formed and some of these by-products are extremely difficult to eliminate from the desired sodium salt of cyclohexylsulfamic acid.

The by-product which is most difficult to remove from sodium cyclohexylsulfamate is sodium sulfate. It is always present because some cyclohexylamine sulfate invariably forms when cyclohexylamine is reacted with a sulfonating agent such as sulfamic acid or sulfur trioxide in the manufacture of the cyclohexylammonium-N-cyclohexylsulfamate (hereafter referred to as "double-salt"). While the latter is hydrolyzed with sodium hydroxide to the desired sodium cyclohexylsulfamate, the previously formed by-product cyclohexylamine sulfate converts to sodium sulfate. It is very difficult to eliminate cyclohexylamine sulfate from the above-mentioned "double-salt" and it is even more difficult to separate sodium cyclohexylsulfamate from sodium sulfate.

It is therefore an object of the present invention to prepare sodium cyclohexylsulfamate substantially free of by-products. It is a particular object to produce sodium cyclohexylsulfamate free of sodium sulfate. It is another object to produce sodium cyclohexylsulfamate essentially free of colored by-products which even in trace amounts are extremely objectionable in consumer goods such as sodium cyclohexylsulfamate, known generically as sodium cyclamate.

These and other objects are accomplished by converting calcium cyclohexylsulfamate into sodium cyclohexylsulfomate according to the equation

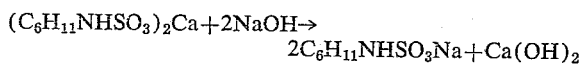

The sodium hydroxide must be used in at least the stoichiometric amount. Excellent results are obtained when this reaction is carried out in aqueous solution, using a 2–5% excess of sodium hydroxide over the stoichiometric amount.

The calcium cyclohexylsulfamate is made from the "double-salt" by hydrolysis with calcium hydroxide. The latter is used in an excess of 5–20% over the stoichiometric amount, which amount can easily be determined from the amount of "double-salt" present in the "double-salt" solution plus the amount of free cyclohexylamine sulfate in said solution. The calcium cyclohexylsulfamate obtained in this reaction is water-soluble while any calcium sulfate which may form as a major by-product is nearly insoluble and can be separated from said calcium cyclohexylsulfamate solution by known techniques. The liquid phase thus obtained is substantially free of sulfate ions and, if desired, calcium cyclohexylsulfamate can be recovered from this solution in high yield and excellent quality. However, in the process of making sodium cyclohexylsulfamate, this solution can be directly converted to sodium cyclohexylsulfamate according to the equation shown above. In this reaction, no additional sulfate salt is formed and thus virtually pure sodium cyclohexylsulfamate is obtained. Of course, dry calcium cyclohexylsulfamate may also be used for this conversion, but it must first be completely dissolved before the sodium hydroxide is added so that the precipitating calcium hydroxide does not settle on or around some undissolved particles of the calcium cyclohexylsulfamate and thereby cause a loss of product.

When the aqueous solution of calcium cyclohexylsulfamate is converted to the corresponding sodium salt by the addition of at least a stoichiometric amount of sodium hydroxide according to the above equation, calcium hydroxide immediately precipitates from the reaction mixture. The precipitated calcium hydroxide can easily be separated from the aqueous solution containing the sodium cyclohexylsulfamate by filtration or other known techniques but this separation is preferably carried out at elevated temperatures since the solubility of sodium cyclohexylsulfamate increases with increasing temperatures, while the solubility of calcium hydroxide decreases at the same time. Furthermore, either the calcium cyclohexylsulfamate solution to be converted or the solution of sodium cyclohexylsulfamate obtained have to be concentrated for the recovery of the latter and therefore no additional heating is involved in separating the precipitated calcium hydroxide at elevated temperature.

The simple process of the present invention produces two major advantages over existing processes: (a) the sulfate ions are precipitated from the calcium cyclohexylsulfamate solution in a step which renders the sulfate ions insoluble while the desired cyclohexylsulfamic acid salt remains in solution, providing for excellent and easy separation between product and by-product, and (b) colored particles and other by-products which may have formed during the preparation steps for "double-salt" or the hydrolysis of the latter are substantially eliminated by the separation step for calcium cyclohexylsulfamate. An additional advantage, particularly appreciated by the manufacturer of both the calcium and sodium cyclohexylsulfamate, is that he will be able to produce calcium cyclohexylsulfamate on a continuous basis and can convert this product, as required, into the corresponding sodium salt. When both products are to be produced, the most practical procedure consists in concentrating the first-made calcium cyclohexylsulfamate solution to a certain concentration and filtering that solution at a chosen temperature so that a considerable portion of calcium cyclohexylsulfamate is obtained in crystalline form. Another substantial portion of the calcium cyclohexylsulfamate, the exact amount depending on the concentration and filtration temperature chosen, remains in the filtrate and instead of recovering therefrom a second crop thereof, this solution is well suited for conversion into the sodium cyclohexylsulfamate according to the process of this invention. For example, when only small amounts of sodium cyclohexylsulfamate are to be made for immediate use, the calcium cyclohexylsulfamate solution can be concentrated to contain as much as about 50% of the solid material, and it may then be cooled to 20° C., whereby 60% of excellent quality, first-crop material crystallizes. The mother liquor, which ordinarily is worked up for a second crop of calcium cyclohexylsulfamate, can then be used for the conversion into sodium cyclohexylsulfamate by the addition of an easily determinable amount of sodium hydroxide, and the sodium cyclohexylsulfamate obtained is of much higher quality than a second crop of calcium cyclohexylsulfamate would be if recovered from this mother liquor.

To better understand the process of the present inven-

Example 1

(a) 740 lbs. of an aqueous solution containing 331 lbs. of cyclohexylammonium-N-cyclohexylsulfamate and 20.3 lbs. of cyclohexylamine sulfate is hydrolyzed with 128 lbs. of a 50% aqueous sodium hydroxide solution. The cyclohexylamine liberated in this process is removed and the liquors are concentrated for recovery of sodium cyclohexylsulfamate by fractional crystallization. The recovered solids which amount to about 92% of the total amount of sodium cyclohexylsulfamate present initially in the solution are contaminated with about 1.5% of sodium sulfate and thus are not acceptable.

(b) In a similar batch, 671 lbs. of an aqueous solution containing 121 lbs. of cyclohexylammonium-N-cyclohexylsulfamate and 15 lbs. of cyclohexylamine sulfate is hydrolyzed with 24 lbs. of calcium hydroxide and the solution is concentrated so that the concentration of calcium cyclamate is about 45% and is then filtered at a temperature of 90° C. to remove the insoluble calcium sulfate and excess calcium hydroxide. The filtrate is worked up by known means to recover calcium cyclohexylsulfamate dihydrate. The crystallizing solids account for 87% of the total calcium cyclohexylsulfamate present initially and are essentially free of any sulfate contamination. Approximately 64 lbs. of this material is dissolved in 90 lbs. of hot water and this solution is treated with 25.8 lbs. of a 50% aqueous sodium hydroxide solution. The calcium hydroxide formed during this reaction is filtered off and can be reused for the initial hydrolysis of a subsequent batch. From the filtrate, sodium cyclohexylsulfamate is recovered in the usual way by concentrating the solution to a content of 43% of sodium cyclohexylsulfamate and subsequent cooling, whereupon 92% of the theoretical amount of sodium cyclohexylsulfamate is recovered, in two crops, both being snow-white and of excellent quality, i.e., free of sulfate contamination and free of any discoloration.

Example 2

160 lbs. of mother liquors containing 26 lbs. of calcium cyclohexylsulfamate, obtained as the filtrate in the preparation of a first crop of calcium cyclohexylsulfamate, is treated with 10.8 lbs. of a 50% aqueous sodium hydroxide solution. Calcium hydroxide is filtered off and the resulting liquors are worked up in the usual manner and two crops of sodium cyclohexylsulfamate are recovered and combined to produce a total of 22 lbs. of white sodium cyclohexylsulfamate having a purity of 99–99.5%.

Others may practice the invention in any of the numerous ways which will be suggested to one skilled in the art by the present disclosure. All such practice of the invention is considered a part hereof provided it falls within the scope of the appended claims.

I claim:
1. The process of preparing sodium cyclohexylsulfamate free of sulfate ions, comprising the steps of
   hydrolyzing cyclohexylammonium - N - cyclohexylsulfamate with a 5–20% excess over the stoichiometric amount of calcium hydroxide,
   filtering the solution,
   adding to the filtrate sodium hydroxide in an amount at least equal to the stoichiometric amount,
   filtering off the precipitated calcium hydroxide, and
   recovering the sulfate-free sodium cyclohexylsulfamate from the filtrate.

2. The process of claim 1 wherein sodium hydroxide is used in an excess of 2–5% over the stoichiometric amount.

References Cited

UNITED STATES PATENTS

| | | | |
|---|---|---|---|
| 2,799,700 | 7/1957 | Cummins et al. | 260—500 |
| 2,804,472 | 8/1957 | Loder | 260—500 |

LEON ZITVER, *Primary Examiner.*